United States Patent [19]

Kage et al.

[11] Patent Number: 4,525,868
[45] Date of Patent: Jun. 25, 1985

[54] INTERFERENCE WAVE DETECTION CIRCUIT FOR USE IN RADIO RECEIVER

[75] Inventors: Kouzou Kage, Tokyo; Hiroshi Watanabe, Miyagi, both of Japan

[73] Assignees: Nippon Electric Co., Ltd.; Nippon Telegraph & Telephone Public Corporation, both of Tokyo, Japan

[21] Appl. No.: 478,119

[22] Filed: Mar. 23, 1983

[30] Foreign Application Priority Data

| Mar. 23, 1982 | [JP] | Japan | 57-44671 |
| Mar. 23, 1982 | [JP] | Japan | 57-44672 |
| Mar. 23, 1982 | [JP] | Japan | 57-44673 |
| Mar. 23, 1982 | [JP] | Japan | 57-44674 |

[51] Int. Cl.³ .......................... H04B 1/10; H04B 1/16
[52] U.S. Cl. .................................... 455/206; 455/295; 455/303
[58] Field of Search ............... 455/205, 210, 212, 295, 455/296, 303, 305, 206; 329/130–132, 135; 328/165

[56] References Cited

U.S. PATENT DOCUMENTS

| 3,728,634 | 4/1973 | Watkinson | 455/212 |
| 3,851,263 | 11/1974 | Fukushima et al. | 455/212 |
| 4,038,604 | 7/1977 | Koerber | 455/212 |
| 4,405,835 | 9/1983 | Jansen et al. | 455/212 |

FOREIGN PATENT DOCUMENTS

| 6542 | 1/1981 | Japan | 455/212 |
| 48729 | 5/1981 | Japan | 455/210 |
| 68933 | 4/1982 | Japan | 455/212 |

OTHER PUBLICATIONS

"Angle-Modulated Signals Suffer Less AM Distortion", by Kongable, Electronics, 2/14/82.

*Primary Examiner*—Jin F. Ng
*Attorney, Agent, or Firm*—Sughrue, Mion, Zinn, Macpeak & Seas

[57] ABSTRACT

An interference detector for use in determining when two carriers are producing a beat signal, comprising a low frequency automatic gain control amplifier 1' amplifying the received signal, a demodulator 5 and voice detector 6 for determining if the received signal is modulated, an amplitude detector 2 for measuring the amplitude of the amplifier output, a level measuring circuit 3 for measuring the beat component of the amplitude detector output, a comparator 4 for outputting an interference signal when the beat component exceeds a predetermined level, and a gate 7, 8 controlled by the voice detector for inhibiting the interference signal when the received signal is modulated.

17 Claims, 11 Drawing Figures

INTERFERENCE WAVE DETECTION CIRCUIT FOR USE IN RADIO RECEIVER

BACKGROUND OF THE INVENTION

This invention relates to a circuit for detecting interference signals received in a radio receiver and, more particularly, to an interference detection circuit suitable for use in a mobile radio communication system of multi-frequency access type.

In a wireless telephone system which is one type of mobile radio communication systems, as will be described in detail later, a plurality of radio substations are individually connected to subscriber lines, which are respectively coupled to corresponding radio telephone sets via radio channels. If different frequencies are allotted to respective radio channels, there will be no interference among these channels under normal conditions. In practice, however, to utilize the frequencies more effectively, the radio channels of the adjacent radio zones share the same frequency band. This causes these radio channels to interfere with each other. Such interference provides a beat in the received signals because there is a slight frequency difference in the radio channels of the same frequency. To avoid the beat and establish normal telephone services, the channel concerned should be switched to another free channel.

Such switching of the channel is conventionally carried out by manually operating the switch when a subscriber hears beat sounds. However, in order to confirm the beat sound, he has to listen to it for a certain duration of time. This is not only uncomfortable to the subscriber but also is detrimental to the system as the communication over the radio channel should be suspended for the time being.

SUMMARY OF THE INVENTION

An object of the present invention accordingly is to provide an interference detection circuit for accurately detecting the beat caused by the interference between carrier waves of channels.

Another object of the present invention is to provide an interference detection circuit for detecting the above-mentioned beat within a time as short as possible.

According to one aspect of the present invention, there is provided an interference detection circuit comprising amplifier means for amplifying a received carrier wave in response to a control signal; amplitude detector means for amplitude-detecting the output from the amplifier means; means for supplying the output of the amplitude detector means to the amplifier means as the control signal so as to set constant the output level of the amplifier means; level measuring means for measuring the level of the output fluctuation of the amplitude detector means; comparator means for comparing the output level of the level measuring means with a predetermined level to provide a compared output as an interference detection signal to the output of the interference detection circuit; discriminating means connected to the output of the amplifier means for judging whether the received carrier wave is modulated or not; and gate means responsive to the output of the discriminating means for preventing the compared output from reaching the output of the interference detection circuit when the discriminating means judges that the received carrier wave is modulated.

BRIEF DESCRIPTION OF THE DRAWINGS

Other objects, features and advantages of the present invention will become more apparent from the description hereinbelow with reference to the accompanying drawings, in which.

The invention is a circuit for detecting interference between two carriers producing a beat in which the amplitude of the beat in the received signal is measured after passing through a low frequency automatic gain control amplifier. If the beat exceeds a set level, an interference signal is output. However, no interference signal is output if a voice signal is detected in the demodulated output of the automatic gain control amplifier.

DETAILED DESCRIPTION OF THE PREFERRED EMBODIMENTS

Figure 1:
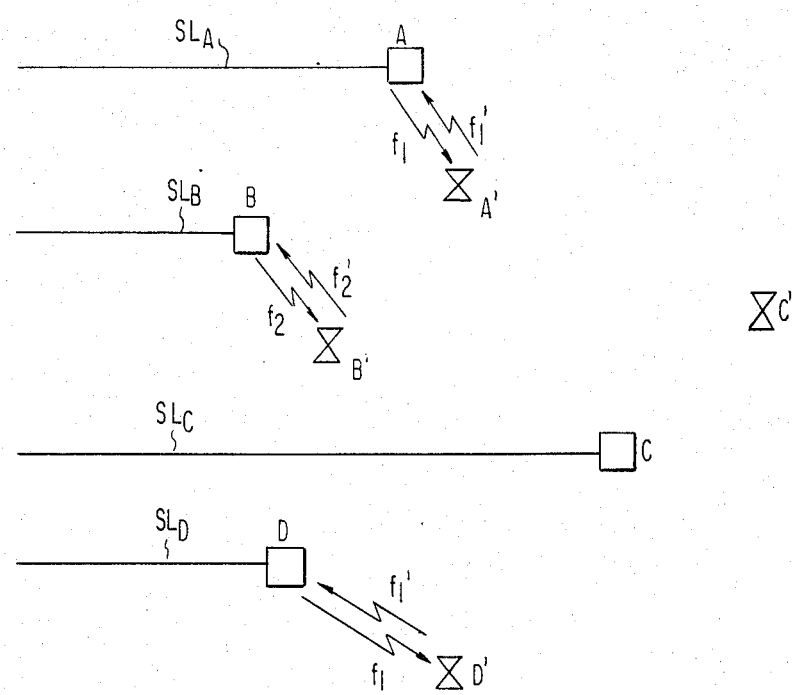
FIG. 1 is a schematic diagram of a wireless telephone system which is an example of mobile radio communication systems.

In FIG. 1, radio substations A, B and C are connected respectively to subscriber lines $SL_A$, $SL_B$ and $SL_C$. As described hereinabove, if each of radio channels is allotted with a different and individual frequency, interference among them will not occur as a rule. However, the general practice is that plural channels share the same frequency band to use the frequencies more effectively.

It is assumed that two sets of transmitting/receiving frequencies ($f_1$, $f_1'$, and $f_2$, $f_2'$) alone are allotted to the 3 combinations of radio substations A, B and C and radio telephone sets A', B' and C', and respective substations and telephone sets are so configured that they can use these 2 sets of frequencies. When the radio substation B and the radio telephone set B' are to begin a communication while the radio substation A and the radio telephone set A' are using the frequencies $f_1$, $f_1'$, the system is so constructed to detect that the frequencies $f_1$, $f_1'$ are in use and to automatically select another set of free frequencies, $f_2$, $f_2'$, to establish a new channel.

When the radio substation C and the radio telephone set C' are to begin the use of the channel at the same time, as both sets of frequencies $f_1$, $f_1'$, and $f_2$, $f_2'$ are in use, the substation C and telephone set C' cannot be connected to each other and they have to wait till either one of the frequencies becomes free.

When a plurality of such systems are attached to a public telephone network, the radio substation D and the radio telephone set D' belonging to another group may use the frequencies $f_1$, $f_1'$ to establish a radio channel. If they are located at places remote enough to avoid interference, no problems will occur. But when the radio telephone set A' moves closer to the radio substation D, the radio substation D will receive the carrier wave from the radio telephone set A' in addition to that from the radio telephone set D', and mutual interference takes place as previously mentioned. The radio substation D and the radio telephone set D' are then switched to other free frequencies. The circuit according to the present invention enables an interference detection signal to be obtained in shorter time and with a higher accuracy which is necessary for electronic switching instead of manual switching.

When two carrier waves allotted in the same frequency band cause interference, the difference between the frequencies of these two carrier waves generally appears as a beat in the received signal. Since the beat is an envelope signal of the carrier waves, the beat can be amplitude-detected. Precise detection, however, can not be made by merely detecting the received signal. Even if phase modulation (PM) or frequency modulation (FM), i.e., angle modulation is adopted to the system, fluctuations will occur not only in phase but in amplitude during conversation. This is because the non-linearity of frequency and/or phase characteristics of the transmission line reduces the amount of phase or frequency modulation and introduces amplitude modulation. This phenomenon is known as PM (or FM)-to-AM conversion. As a result, if the level of amplitude fluctuation is simply measured, there is a disadvantage or inconvenience in that the amplitude fluctuation during conversation is erroneously detected as an interference wave. Furthermore, since a wireless telephone set is movable, the desired-to-undesired (D/U) ratio of the received signal might vary radically due to fading, resulting in suddenly intensified beat sound. This may sometimes be erroneously detected as an interference.

The present invention is conceived based on the above-mentioned points and aims to accurately detect an interference wave, if any.

Figure 2:
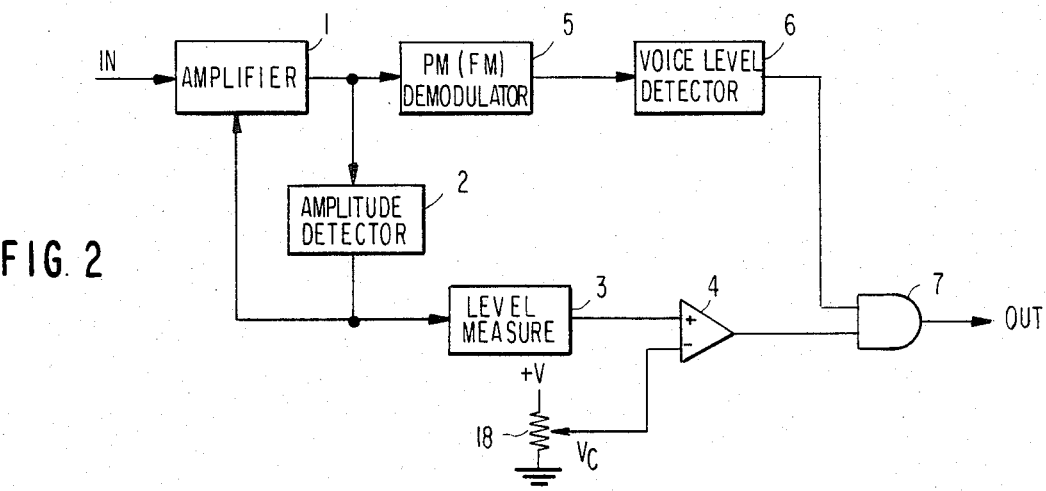
FIG. 2 is a block diagram illustrating an embodiment of the interference detection circuit according to the present invention.

Referring now to FIG. 2, the output level of an amplifier circuit 1 whose gain is controllable is detected by an amplitude-detector 2. The gain of the amplifier circuit 1 is controlled in a manner to make its output level a constant value according to the output of the amplitude-detector 2. In other words, the output voltage of the amplitude detector 2 acts to lower the gain of the amplifier circuit 1 when the level of the received carrier wave is high and to raise the gain when the level of the received carrier wave is low. Therefore, when the amplitude of the received carrier wave is fluctuating because of the interfering waves or the like, the beat signal extracted in the amplitude detector 2 suppresses such fluctuation. The level of the extracted beat signal is then measured by a level measuring circuit 3, as will be obvious from FIGS. 4 and 5.

The output of the level measuring circuit 3 is compared at a comparator 4 with a reference voltage Vc which is supplied from a potentiometer 18. The comparator 4, when the output level of the circuit 3 exceeds the voltage Vc, provides a signal showing that the amplitude fluctuation of the received carrier wave has reached a predetermined value.

Even if there are no interference waves and even if only one carrier wave is received, as far as it is phase or frequency modulated with a voice signal, etc., the level fluctuation due to the aforementioned PM(or FM)-to-AM conversion will unavoidably occur in the received carrier wave and therefore, should be separated from the level fluctuation due to the interference waves.

Since the demodulation output level from a PM (or FM) demodulator 5 becomes high during conversation, the level is detected by a voice level detector 6 to learn whether there is a voice signal or not; in other words whether the carrier is modulated with a voice signal or not. When the voice level detector 6 detects that there is a voice signal, the output of the comparator 4 is not necessarily raised by interference wave. Accordingly, responsive to the output of the voice level detector 6, a gate circuit 7 prevents erroneous detection of interference waves.

Figure 3:
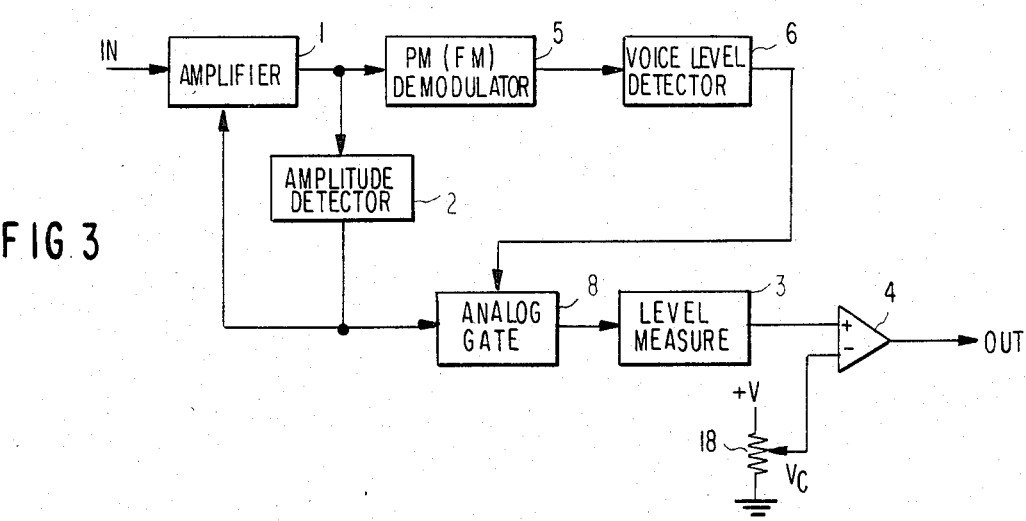
FIG. 3 is a block diagram illustrating the second embodiment of the interference detection circuit according to the present invention.

In FIG. 3, reference numerals 1 to 6 are identical with those used for FIG. 2, except that the circuit of FIG. 3 is different from that of FIG. 2; an analog gate 8 is incorporated on the input side of the level measuring circuit 3, replacing the gate circuit 7 of FIG. 2. That is, when the voice level detector 6 detects that the carrier wave is modulated, the analog gate 8 is open-circuited even if the output of the amplitude detector 2 fluctuates slightly, so as to prevent the output of the level measuring circuit 3 from rising thereby avoiding erroneous detection of interference waves.

If there are interference waves, the beat will affect the phase (or the frequency) of the carrier wave, and the demodulation in PM (or FM) will generate beat sounds, thereby degrading the speech quality. When the D/U ratio widely fluctuates due to fading, the beat sound suddenly becomes louder, and it is necessary to detect the interference wave quickly. Besides, when the interference wave exceeds the desired wave due to fading, i.e., the D/U ratio deteriorates, the demodualted result of the interference wave appears in the PM (or FM) demodulation output, so that crosstalk might be caused. Therefore, a certain precaution described hereinbelow should be taken for the detection of interference waves when there is fading.

Figure 4:
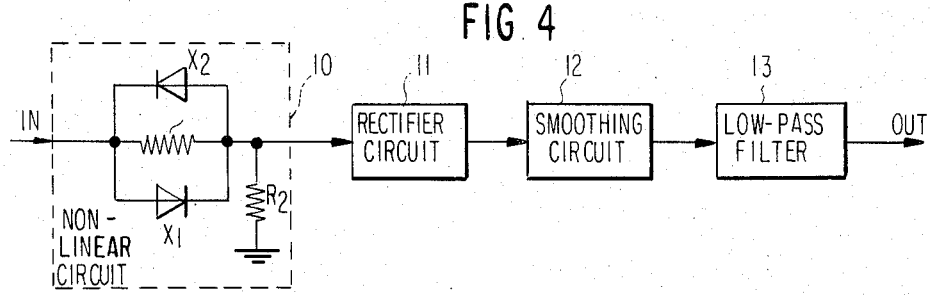
FIGS. 4 and 5 are block diagrams illustrating specific construction of the level measuring circuit in the circuits shown in FIGS. 2 and 3.
Figure 5:
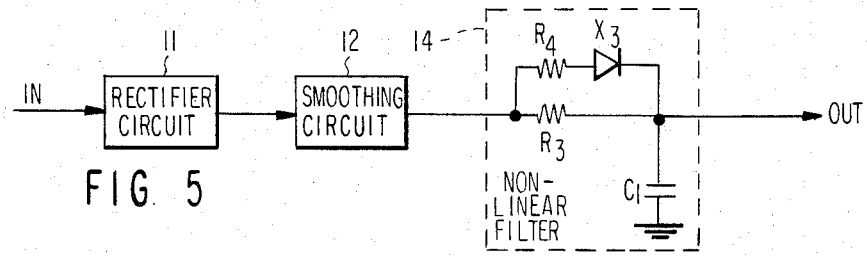

FIGS. 4 and 5 show specific structures of the level measuring circuits which have been conceived in order to quickly detect interference waves when a beat signal has a high level. The circuits correspond to the circuit 3 used in FIGS. 2 and 3. The level measuring circuit shown in FIG. 4 includes a non-linear circuit 10 through which the high level fluctuation component easily passes, a rectifier circuit 11, a smoothing circuit 12, and a low-pass filter 12. When the level of an input (IN) is high enough to render diode $X_1$ or $X_2$ conductive, the output of the non-linear circuit 10 rises quickly in response to the high level input and, also, the output (OUT) which is rectified, smoothed and filtered quickly rises because the conductive diode $X_1$ or $X_2$ has a low resistance which reduces the time constant of the smoothing circuit 12. Therefore, when the high level beats are supplied to the non-linear circuit 10, the circuit shown in FIG. 4 can quickly detect them as interference.

In FIG. 5 the rectifier circuit 11 and the smoothing circuit 12 are identical to those of FIG. 4 except that a non-linear filter 14 is also added for stabilizing the output of the smoothing circuit 12. In the level measuring circuit shown in FIG. 5, if the level of an input (IN) is small, the smoothed value is also small, so that a diode $X_3$ will not conduct and whereby the filter 14 filters the output of the smoothing circuit 12 with a time constant $R_3C_1$. When the level of input (IN) is high, the output which has been smoothed in the smoothing circuit 12 will show a larger value, and the diode $X_3$ will and the capacitor $C_1$ is charged not only by the resistance $R_3$ but also by the resistance $R_4$, thereby making the response of the circuit shown in FIG. 5 faster.

If the level measuring circuit shown in FIGS. 4 or 5 is thus utilized, even if the beats due to interference waves become larger because of fading, the level measuring circuit detects them more quickly thereby preventing the loud beat sound from becoming audible to the subscriber for a long period.

Figure 7:
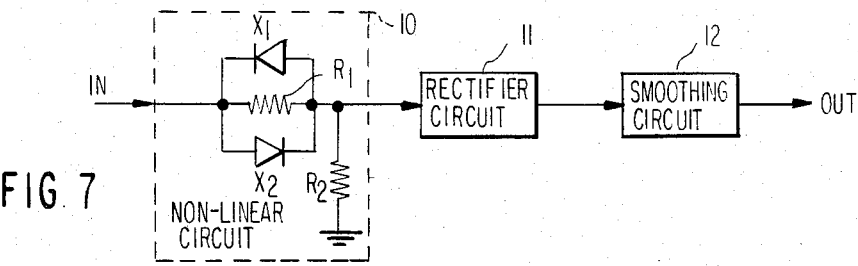
FIG. 7 is a block diagram of the circuit structure of the level measuring circuit shown in FIG. 6.
Figure 6:
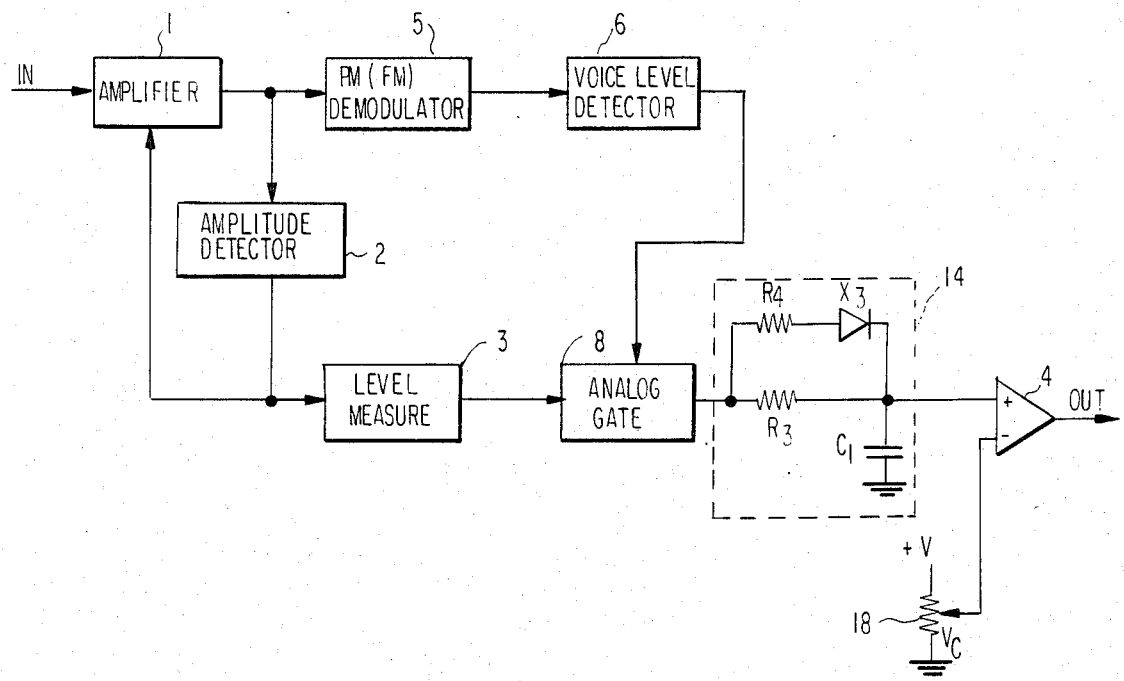
FIG. 6 is a schematic block diagram illustrating still another embodiment according to the present invention which is a modification of the circuit shown in FIG. 3.

In FIG. 6, there is provided a non-linear low-pass filter 14 between the output of the analog gate 8 and the input of the comparator 4. The filter 14 is structured similarly to the non-linear filter shown in FIG. 5 so as to allow quick enough response to the beats of high level. A similar effect will be obtained if the level measuring circuit 3 is incorporated with a non-linear circuit instead of structuring the low pass filter 14 in a non-linear form. More specifically, the level measuring circuit 3 may be constructed as shown in FIG. 7 which is identical to the circuit structure shown in FIG. 4 except for the fact that the low-pass filter 13 is omitted.

Figure 8:
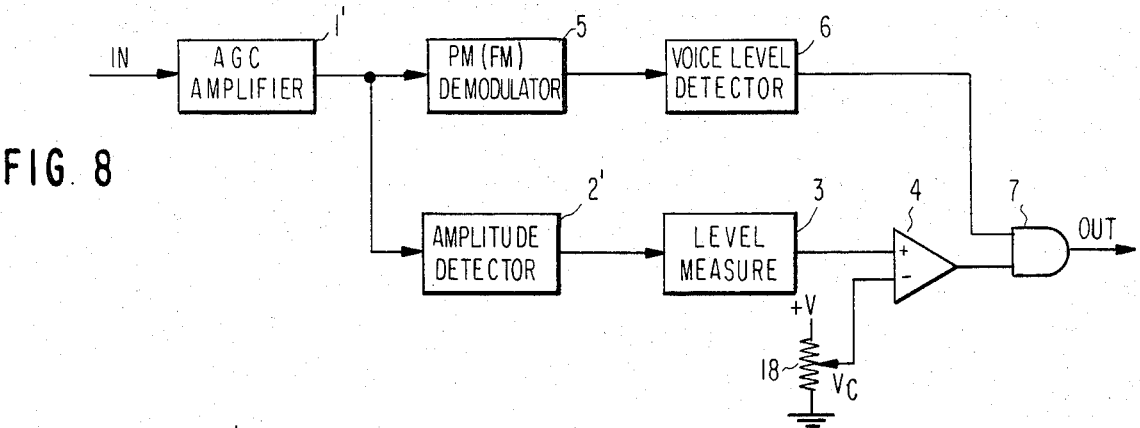
FIG. 8 is a block diagram illustrating still another embodiment of the present invention which is a modification of the circuit shown in FIG. 2.

Referring now to FIG. 8, an automatic-gain-control (AGC) amplifier circuit 1' is a circuit of the type which can control the gain in respect of the amplitude fluctuation such as subsequent fading but can not control the gain in respect of fast amplitude fluctuation such as beats caused by interference. In other words, although a signal of slow fluctuation such as fading is eliminated from the outputs from the amplifier circuit 1', when there is an interference wave in the received carrier wave besides a desired wave, beats corresponding to the frequency difference will be generated. The amplitude detector circuit 2' extracts the beats which appears as the fluctuation component of the amplitude of the carrier wave remaining in the output of the amplifier circuit 1'. The level measuring circuit 3 measures the level of the beats supplied from the amplitude detector circuit 2'. When the output of the level measuring circuit 3 exceeds the threshold voltage $V_c$, the comparator 4 judges that the amplitude fluctuation has reached a predetermined value. The PM (FM) demodulator circuit 5 for preventing erroneous detection of interference waves, the voice level detector 6 and the gate circuit 7 operate identically to those shown in FIG. 2.

Figure 9:
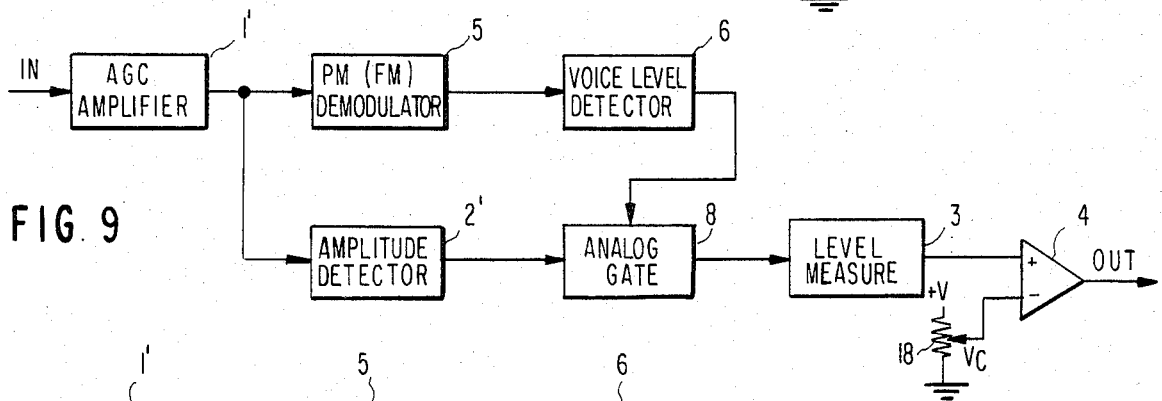
FIG. 9 is a block diagram illustrating yet another embodiment of the present invention which is a modification of the circuit shown in FIG. 3.

In FIG. 9, the analog gate 8 is positioned at the same location and operates in the same way as that of the embodiment shown in FIG. 3. The other components are identical to those of FIG. 8 and operate in the same way as the FIG. 8.

Figure 10:
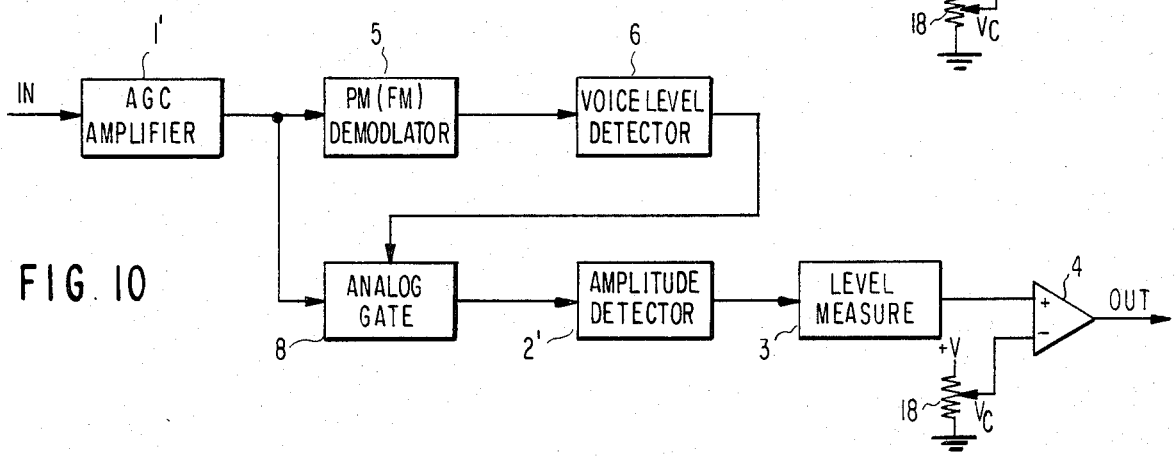
FIG. 10 is a block diagram illustrating another embodiment of the present invention which is a modification of the circuit shown in FIG. 9.

The circuit of FIG. 10 is a modification of the one shown in FIG. 9 except that the analog gate 8 and the amplitude detector 2' are interchanged. More specifically, when the voice level detector 6 detects that the carrier wave is modulated, the analog gate 8 becomes blocked to make the output of the amplitude detector 2' constant, thereby preventing the output of the level measuring circuit 3 from rising. Hence, there is no possibility for erroneously detecting the output of the comparator 4 as an interference wave.

In the interference detecting circuits shown in FIGS. 8 to 10, the circuits shown in FIGS. 4 and 5 may be used as the level measuring circuit 3 in a similar manner to those shown in FIGS. 2 and 3 in order to quickly detect the interference when beats have a high level.

Figure 11:
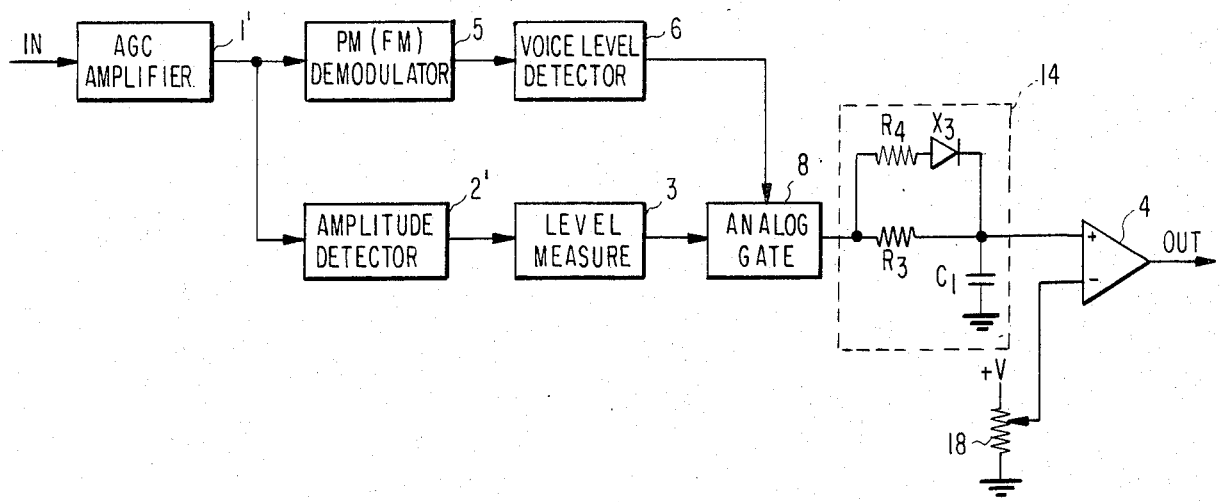
FIG. 11 is a block diagram illustrating still another embodiment of the present invention which is a partially modified combination of the circuits shown in FIGS. 6 and 8.

In FIG. 11, the amplifier circuit 1', the amplitude detector 2', PM (FM) demodulator circuit 5 and the voice level detector 6 are identical to those shown in FIG. 8. While the combination of the level measuring circuit 3, the analog gate 8, the low-pass filter 14 and the comparator 4 is the same as that shown in FIG. 6. These corresponding circuits operate also in a similar manner. The circuit shown in FIG. 7 may be used as the level measuring circuit similarly as the embodiment of FIG. 6.

As above described in detail, the circuit according to the present invention enables automatic detection of the fact that an interference occurs from the beats in the carrier wave received by a radio receiver. The circuit according to the present invention is especially superior in the response characteristics with respect to the level fluctuation of beats caused by fading and in protective operation against the erroneous detection of interference waves during conversation. By controlling the automatic switching of frequencies with the output of the interference wave detector of the present invention, a mobile radio communication system which can accurately and automatically avoid interference is available.

The circuit according to the present invention is particularly effective when such an automatic frequency switching device is used in combination with a wireless telephone set.

What is claimed is:

1. An interference wave detection circuit comprising:
   amplifier means for amplifying a received carrier wave in response to a control signal;
   amplitude detector means for amplitude-detecting the output of said amplifier means;
   means for supplying the output of said amplitude detector means to said amplifier means as said control signal so as to make the output level of said amplifier means constant;
   level measuring means for measuring the level of the output fluctuation of said amplitude detector means;
   comparator means for comparing the output level of said level measuring means with a predetermined level to provide a compared output as an interference wave detection signal to the output of said interfence wave detection circuit;
   discriminating means connected to the output of said amplifier means for judging whether said received carrier wave is modulated or not; and
   gate means responsive to the output of said discriminating means for preventing said compared output from reaching to the output of said interference wave detection circuit when said discriminating means judges that said received carrier wave is modulated.

2. An interference wave detection circuit, as claimed in claim 1, characterized in that said level measuring means responds slowly when its output level is low, while said level measuring means responds quickly when its input level is high.

3. An interference wave detection circuit, as claimed in claim 2, wherein said level measuring means comprises a serial-connected combination of non-linear circuit means for passing high-level components out of the input thereof, rectifier circuit means for rectifying the input thereof, smoothing circuit means for smoothing the input thereof.

4. An interference wave detection circuit, as claimed in claim 2, wherein said level measuring means comprises a serially connected combination of rectifier circuit means for rectifying the input thereof, smoothing circuit means for smoothing the input thereof, and low-pass filter means for filtering the input thereof; said filter means including a primary circuit which comprises a resistor and a capacitor and a resistive circuit which includes a diode, said resistive circuit connected to both sides of said resistor.

5. An interference wave detection circuit, as claimed in claim 1, wherein said received carrier wave is an angle-modulated carrier wave and wherein said discriminating means comprises means for angle-demodulating said received carrier wave to provide a demodulated output, and means for detecting said demodulated output to provide the resultant as the output of said discriminating means.

6. An interference wave detection circuit comprising:
   amplifier means for amplifying a received carrier wave in response to a control signal;
   amplitude detector means for amplitude-detecting the output of said amplifier means;
   means for supplying the output of said amplitude detector means to said amplifier means as said control signal so as to make the output level of said amplifier means constant;
   level measuring means for measuring the level of output fluctuation of said amplitude detector means;
   discriminating means connected to the output of said amplifier means for judging whether said received carrier wave is modulated or not;
   analog gate means responsive to the output of said discriminating means for preventing the output of said level measuring means from passing therethrough when said discriminating means judges that said received carrier wave is modulated;
   low-pass filter means for filtering the output of said analog gate means; and
   comparator means for comparing the output of said low-pass filter means with a predetermined level to provide the resultant as an interference wave detection signal.

7. An interference wave detection circuit, as claimed in claim 6, wherein said received carrier wave is an angle-modulated carrier wave and wherein said discriminating means comprises means for angle-demodulating said received carrier wave to provide a demodulated output, and means for detecting said demodulated output to provide the resultant as the output of said discriminating means.

8. An interference wave detection circuit, as claimed in claim 6, characterized in that said low-pass filter means comprises a non-linear type low-pass filter which responds slowly when the output level of said amplitude detector means is low and quickly when the output level of said amplitude detector means is high.

9. An interference wave detection circuit, as claimed in claim 8, wherein said low-pass filter means comprises a primary circuit which comprises a resistor and a capacitor and a resistive circuit which includes a diode, said resistive circuit connected to both sides of said resistor.

10. An interference was detection circuit, as claimed claim 6, wherein said level measuring means comprises a serially connected combination of non-linear circuit means for passing high-level components out of the input thereof, rectifier means for rectifying the input thereof, and smoothing circuit means for smoothing the input thereof.

11. An interference wave detection circuit comprising:
    amplifier means having automatic gain control function for amplifying a received carrier wave;
    amplitude detector means for detecting the level fluctuation in the output of said amplifier means;
    level measuring means for measuring the level of the output fluctuation of said amplitude detector means;
    comparator means for comparing the output level of said level measuring means with a predetermined level to provide a compared output as an interference wave detection signal to the output of said interference wave detection circuit;
    discriminating means connected to the output of said amplifier means for judging whether said received carrier wave is modulated or not; and
    gate means responsive to the output of said discriminating means for preventing said compared output from reaching to the output of said interference wave detection circuit when said discriminating means judges that said received carrier wave is modulated.

12. An interference wave detection circuit, as claimed in claim 11, characterized in that said level measuring means responds slowly when its input is low, while said level measuring means responses quickly when its input level is high.

13. An interference wave detection circuit, as claimed in claim 11, wherein said received carrier wave is an angle-modulated carrier wave and wherein said discriminating means comprises means for angle-demodulating said received carrier wave to provide a demodulated output, and means for detecting said demodulated output to provide the resultant as the output of said discriminating means.

14. An interference wave detection circuit comprising:
    amplifier means having automatic gain control function for amplifying a received carrier wave;
    amplitude detector means for detecting the level fluctuation in the output of said amplifier means;
    level measuring means for measuring the level of the output fluctuation of said amplitude detector means;
    discriminating means connected to the output of said amplifier means for judging whether said received carrier wave is modulated or not;
    analog gate means responsive to the output of said discriminating means for preventing the output of said level measuring means from passing therethrough when said discriminating means judges that said received carrier wave is modulated;
    low-pass filter means for filtering the output of said analog gate means; and
    comparator means for comparing the output of said low-pass filter means with a predetermined level to provide the resultant as an interference wave detection signal.

15. An interference wave detection circuit, as claimed in claim 14, characterized in that said low-pass filter means comprises a non-linear type low-pass filter which responds slowly when the output level of said amplitude detector means is low and quickly when the output level of said amplitude detector means is high.

16. An interference wave detection circuit, as claimed in claim 14, wherein said level measuring means comprises a serially connected combination of non-linear circuit means for passing high-level components out of the input thereof, rectifier means for rectifying the input thereof, and smoothing circuit means for smoothing the input thereof.

17. An interference wave detection circuit, as claimed in claim 14, wherein said received carrier wave is an angle-modulated carrier wave and wherein said discriminating means comprises means for angle-demodulating said received carrier wave to provide a demodulated output, and means for detecting said demodulated output to provide the resultant as the output of said discriminating means.

* * * * *